Patented Oct. 26, 1937

2,097,263

UNITED STATES PATENT OFFICE 2,097,263

POLYMERIZATION PRODUCT AND PROCESS OF POLYMERIZATION

Daniel E. Strain, Wilmington, Del., assignor, by mesne assignments, to E. I. du Pont de Nemours & Company, Wilmington, Del., a corporation of Delaware No Drawing. Application July 7, 1936, Serial No. 89,459

18 Claims. (Cl. 260—2)

This invention relates to polymerization products and to a polymerization process and, more particularly, relates to the polymerization of monomeric esters of alpha-methylene monocarboxylic acids in the presence of certain compounds.

The monomeric esters of alpha-methylene monocarboxylic acids have heretofore been polymerized in the presence of certain so-called "oxygen yielding" compounds which have tended to accelerate the rate of polymerization. These compounds are used in catalytic amounts, rarely exceeding 1% by weight of the monomer to be polymerized and usually far less, and are generally referred to as "polymerization catalysts". Benzoyl peroxide is probably the most commonly used of these heretofore known catalysts.

The monomeric esters herein considered are esters of alpha-methylene monocarboxylic acids and can be subgenerically represented by the formula

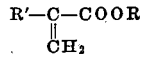

wherein R' is hydrogen or a monovalent hydrocarbon radical and R is a monovalent organic radical; the esters of acrylic and methacrylic acids are of particular interest.

An object of the present invention is to provide a simple and economical process of polymerizing monomeric esters of alpha-methylene monocarboxylic acids. A further object is to provide a new type of agent which functions as a polymerization catalyst, and which may be used in amounts far in excess of ordinary catalytic amounts. Other objects of the invention will be apparent from the description given hereinafter.

The above objects are accomplished according to the present invention by subjecting a monomeric ester of the alpha-methylene monocarboxylic acid to polymerizing conditions in the presence of sulfur dioxide or, if the polymerization reaction be carried out in an aqueous medium, in the presence of sulfurous acid (sulfur dioxide), its water soluble salts, or water soluble hyposulfites.

The present invention may be carried out in several alternate ways, depending upon the desired physical form of the polymer. Where the purpose is to obtain a massive piece of polymer, as in so-called "casting", polymerization of the monomer is carried out in the substantial absence of water or other diluent and sulfur dioxide is employed. In general, the monomer is placed in a mold and subjected to polymerizing conditions in the presence of sulfur dioxide until converted to a solid, massive polymer. It has been found, contrary to expectation, that sulfur dioxide, an oxygen containing reducing oxide of sulfur and not an "oxygen yielding" catalyst such as heretofore used, accelerates the rate of polymerization and may be used for such purpose in catalytic amounts, or may be used in far greater amounts.

Where a polymer in finely divided form is desired, it is convenient to carry out the polymerization in the presence of a liquid diluent, preferably one containing water and in which the polymer is insoluble; either sulfurous acid, its water soluble salts, or water soluble hyposulfites may be used as the polymerization catalyst. The monomeric ester, which is a liquid, with the liquid diluent may form a solution, an emulsion, or merely a mixture. Where a solution or an emulsion is used, the polymer will be obtained in the form of a colloidal dispersion, except in the rather unusual instance where a diluent capable of dissolving the polymer is selected, as it has been found that the type of catalyst herein considered unexpectedly functions as a dispersing agent. If a single mixture of monomeric ester and liquid diluent is used, the mixture should be stirred during polymerization to obtain a colloidal dispersion. The polymer may be recovered from the colloidal dispersion by breaking same in the various ways known in the art; the polymer is obtained in a finely divided form highly suitable for use as a molding compound. If desired, the colloidal dispersion may be used directly in the impregnation of paper, cloth, and other bibulous materials, an advantageous expedient because it makes unnecessary the isolation of the polymer prior to use.

In order to illustrate the present invention, the following examples are given, in which methyl methacrylate monomer is employed, this ester being of considerable commercial interest and well adapted for use in the process of the present invention:

*Example 1.*—A solution composed of 50 grams of monomeric methyl methacrylate containing 1% sulfur dioxide by weight thereof, 100 cc. of water and 100 cc. of methyl alcohol, was refluxed for 96 minutes on a steam bath. The temperature of the mixture was approximately 73° C., its approximate boiling point. At the end of this period a colloidal dispersion of polymer in the water-methyl alcohol diluent liquid was formed and this dispersion was dropped slowly into an evacuated flask surrounded by boiling water and the polymer isolated as a white powder in yield of about 90%. The polymer had a viscosity of about 5.0 poises measured as a 5% solution in dioxan at 25° C. All other viscosities given herein were measured in this manner.

A control sample without sulfur dioxide, under the same conditions, required over 10 hours for polymerization to start.

This example illustrates both the powerful catalytic action of sulfur dioxide and the fact that it acts as a dispersing agent to give a colloidal dispersion of the polymer in the diluent.

Example 2.—Example 1 was repeated using a batch twice the size of that used in Example 1, and the refluxing was carried on for 2.5 hours. At the end of this time the polymer was isolated by filtration. The polymer obtained had a viscosity of 22 poises and moldings thereof softened at 123° C.

Example 3.—A mixture comprising 100 grams of monomeric methyl methacrylate, 377 grams of water and 1 gram of lauryl pyridinium chloride, an emulsifying agent, was passed three times through a colloid mill. To the emulsion obtained was then added a solution of 0.5 gram of lauryl pyridinium chloride and 1 gram of sulfur dioxide in 189 grams of water, and the mixture homogenized by running it through the colloid mill once more. The emulsion thus made was placed in a tightly stoppered bottle in an oven held at approximately 80° C. Polymerization was essentially complete after 3 hours but the bottle was left in the oven for 16 hours. The polymer was precipitated from the colloidal dispersion formed by means of aluminum sulfate, washed with water, and dried 16 hours at 70° C. in a vacuum oven. An 82% yield of polymer having a viscosity of 0.7 poise was obtained. Moldings of the polymer softened at 126° C.

This example illustrates the fact that the sulfur dioxide functions to give a colloidal dispersion of the polymer in the diluent when starting with an emulsion of the monomeric ester in the diluent as compared to starting with a solution of the monomeric ester as in Example 1.

Example 4.—Example 3 was repeated using 2 grams of sodium sulfite and 2 grams of acetic acid in place of the sulfur dioxide. Polymerization was substantially complete within three hours and the polymer was similar in properties to that obtained in Example 3.

Examples 3 and 4 were both repeated without any catalyst but no polymer was obtained even after heating for 10 hours.

Example 5.—A mixture comprising 100 grams of methyl methacrylate monomer containing 1% sulfur dioxide and 400 grams of water, was introduced into a three necked flask equipped with a thermometer, reflux condenser, and hook type stirrer. The charge was brought to 91° C. in 30 minutes and held at the boiling point of the mixture for 1.5 hours, during which period the charge was agitated. The polymer was obtained in 70% yield and remained substantially colloidally dispersed in the liquid diluent. Moldings of the polymer softened at 104° C.

In this example, since a simple mixture of monomer and diluent liquid was employed, the charge was stirred throughout the polymerization in order to get a satisfactory colloided dispersion.

Example 6.—Example 5 was repeated using a polymerization temperature slightly below the boiling point of the mixture, and polymer in 81% yield was thus obtained.

It was noted that samples of the polymer dispersion made in accordance with this example were stable even after four weeks' storage at room temperature.

Example 7.—A sample of monomeric methyl methacrylate containing 1% sulfur dioxide was allowed to stand at room temperature in a glass container in indirect light. After three days' standing, the mass became viscous and gradually hardened to a solid, glass-clear resin.

Example 8.—A solution comprising 75 parts of monomeric methyl methacrylate, 337 parts of water, 337 parts of methyl alcohol, and 7.5 parts of sodium hyposulfite, $Na_2S_2O_4$, was heated at 65° C. Polymerization began in less than one hour and was essentially complete in 5 hours giving a colloidal dispersion of the polymer in the liquid diluent comprising water and methyl alcohol.

A control sample identical with the above, except for the omission of the sodium hyposulfite, had not started to polymerize at the end of 24 hours.

Example 9.—A solution comprising 5 parts of monomeric methyl methacrylate, 22.5 parts of methanol, 22.5 parts of water, and 0.5 part of sodium bisulfite was allowed to stand at room temperature, (about 25° C.). Precipitation of polymer started within one hour and was essentially complete within 5 hours.

The above examples are illustrative of the polymerization of methyl methacrylate to obtain a granular product adapted for use as a molding compound and a glass-clear, bubble-free cast mass, using the sulfur compound in approximately conventional catalytic proportions; that is to say, the sulfur compound is not used in sufficient amounts so that any substantial quantity of it is combined with the polymer formed.

The proportion of catalyst may be as low as 0.01%, by weight of the monomer, of sulfur dioxide or an equivalent weight of others of the catalysts herein disclosed. The use of greater than conventional catalytic amounts of the sulfur compound in the production of polymeric molding compounds is feasible and will accelerate the rate of polymerization. However, where a molding compound is to be produced, it is advisable to wash the product with an alkaline solution, or give it some similar treatment, to reduce the sulfur content if a considerable amount of sulfur compound has been employed. The reason for this is that a molding compound is subjected to relatively high temperatures and there is danger of discoloration of the molded article if the sulfur content of the polymer is not kept low. This is not the case with cast resins where the product is not normally exposed to high temperatures.

In the following examples are given specific illustrations of the production of bubble-free so-called "cast" resins, employing a proportion of sulfur compound far in excess of conventional catalytic amounts:

Example 10.—A solution comprising 50 parts propyl methacrylate and 10 parts sulfur dioxide was allowed to stand 7 days at room temperature. After 24 hours the material was a viscous solution and at the end of 48 hours it had changed to a gel-like consistency. By the end of the seventh day a hard solid was obtained. The casting was then heated 48 hours at 65° C. A hard, glass-clear casting was obtained.

Example 11.—A quantity of 10 grams liquid $SO_2$ was dissolved in 50 grams of isobutyl methacrylate and the composition was allowed to stand at room temperature. After 48 hours the solution had become very viscous and at the end of 7 days it had changed to a tough, very rigid gel. At this time it was placed in a 65° oven and allowed to remain there for 48 hours. A clear casting was obtained.

*Example 12.*—A quantity of 10 grams sulfur dioxide was added to a solution of 25 grams methyl methacrylate and 25 grams octyl methacrylate and the composition was allowed to stand at room temperature. After 48 hours the solution had become very viscous and by the end of 7 days had changed to a rubbery gel. The mass was then heated 48 hours at 65° C. A glass-clear casting was obtained.

*Example 13.*—3,000 grams of monomeric methyl methacrylate in a gallon glass container were treated with sulfur dioxide until the gain in weight amounted to 300 grams. The gallon glass container was then tightly stoppered and allowed to stand at room temperature for two days. Polymerization had then progressed sufficiently to give a stiff gel which just flowed under its own weight. The bottle was then immersed in a water bath at room temperature for two days, at the end of which time a separation of the solidified mass in the glass container started. This was accelerated by cooling for about 3 hours. The solidified mass was then removed from the glass container and allowed to stand at room temperature for 1 day, at 45° C. for 1 day, and finally hardened at 70° C. for 1 day.

*Example 14.*—500 grams of sulfur dioxide was added to 1250 grams of methyl methacrylate monomer in a one-half gallon glass container which was allowed to stand at room temperature for 5 weeks. After that period the material began to separate from the walls of the container which separation was accelerated by holding the container at 10° C. for about 5 hours. This treatment completed the separation of the solidified mass from the walls of the container. The mass was then allowed to stand 3 days at room temperature, 2 days at 45° C., and finally hardened at 70° C. for 1 day.

*Example 15.*—1100 grams of sulfur dioxide were added to 11000 grams of monomeric methyl methacrylate in a 12 liter flask. The flask was allowed to stand at room temperature for 40 hours, at which time its contents had formed a stiff gel. The flask was then placed in a water bath maintained at 12–15° C. for 7 weeks, at the end of which period its contents separated from the walls of the container. The casting thus obtained was then held at room temperature for 8 days, at 45° C. for 8 hours, and then, in succession, at 25° C. for 16 hours, 45° C. for 8 hours, 25° C. for 16 hours, 45° C. for 24 hours, 70° C. for 7 hours, 25° C. for 17 hours, and finally hardened at 70° C. for 48 hours. The final product obtained was a bubble-free solid mass approximately 11″ in diameter.

As the above examples indicate, the viscosity of the mass being polymerized rises rapidly even at relatively low temperatures such as 25–30° C. and this is characteristic of high sulfur dioxide content methacrylate castings. The gel formed conducts the heat of reaction to the surface relatively rapidly so that the danger of bubbles and flaws forming in the casting is minimized. It is a peculiar characteristic of sulfur dioxide that it acts to promote polymerization at a fair rate of speed at temperatures at which other catalysts have substantially no effect. The chilling periods to which the polymerizing mass is subjected in the above examples are for the purpose of avoiding any possibility of local overheating which might cause the formation of bubbles or other flaws.

In the preparation of cast articles, the amount of sulfur dioxide that can be introduced into the substance to be polymerized can and will be varied widely depending upon the results desired. However, the rate of polymerization is affected by the proportion of sulfur dioxide added and it has been found that the maximum rate is obtained when the sulfur dioxide amounts to approximately 8–12% by weight of the compound being polymerized and, for practical purposes, it is preferred to keep the sulfur dioxide content between 5–15% by weight of the compound being polymerized where the sulfur dioxide is to be used in greater than conventional catalytic proportions. The fact that the sulfur dioxide increases the conductivity of the polymerizing mass, as well as acting as a polymerization accelerator, is highly advantageous in tending to reduce the local overheating and hence prevent the formation of bubbles.

Among the esters of alpha substituted methylene monocarboxylic acids particularly suitable for use in this invention may be mentioned, besides methyl methacrylate, other esters of methacrylic acid such as ethyl methacrylate, propyl methacrylate, butyl methacrylate, amyl methacrylate, cetyl methacrylate, cyclohexyl methacrylate, bornyl methacrylate, ethylene glycol dimethacrylate, and the like, as well as mixtures thereof, or mixtures thereof with other polymerizable compounds. Likewise, esters of acrylic acid may be used in the present invention and among such esters are methyl acrylate, ethyl acrylate, propyl acrylate, cetyl acrylate, dodecyl acrylate, octadecyl acrylate, cyclohexyl acrylate, bornyl acrylate, ethylene glycol di-acrylate, and the like, as well as mixtures thereof, or mixtures thereof with methacrylic acid esters or other polymerizable compounds.

The polymerization may be carried out under any of the conditions well known in the art. Polymerization by exposure either to indirect or ultra-violet light at room temperature, or elevated temperature, or the use of heat at either atmospheric or super-atmospheric pressure may be employed. When a liquid diluent is used to obtain a more or less granular product, it is preferred to carry out the polymerization at about the boiling point of the mixture but the use of a lower temperature is not precluded and also the polymerization may be carried out under pressure.

The liquid diluent may be selected from a wide group of liquids or mixtures of liquids, as water, water-alcohol mixtures, alcohols such as methyl, ethyl, propyl, butyl, and amyl alcohol, ketones such as acetone, and the like, benzene, and dioxan. As a matter of economy, the diluent selected should be relatively cheap and preferably a solvent for the monomeric ester; water-methyl alcohol mixtures are eminently suitable for this reason. If desired, the diluent may be a non-solvent for the monomer and the mixture may be emulsified by adding an emulsifying agent and agitating. Or a simple mixture of monomer and liquid diluent may be used and the mixture agitated throughout the polymerization if a colloidal dispersion of the polymer is desired; if agitation is omitted, the polymer is formed in larger pieces or granules. Obviously, the diluent must be inert, i. e., must not react chemically with the ester being polymerized nor function as a polymerization inhibitor.

In place of dodecyl pyridine chloride as the emulsifying agent, illustrated in Example 3, other emulsifying agents may be used as dodecyl sodium sulfate, sodium naphthenate, and such known emulsifying agents.

As will be understood by those skilled in the art, modifying agents as plasticizers, fillers, and also dyes and pigments, and like coloring matter, may be added before, during, or after polymerization of the ester.

As the polymerization catalyst adapted for use in this invention where an aqueous diluent is employed, may be mentioned not only sulfurous acid or sulfur dioxide, but the water soluble sulfites as sodium or potassium sulfite or acid sulfite, and the water soluble hyposulfites as sodium or potassium hyposulfite. Thionyl chloride may likewise be used but, since in the presence of water it decomposes into sulfurous acid and hydrochloric acid, it is, in effect, simply an alternate method of adding sulfurous acid. As stated heretofore, when the polymerization is carried out in the substantial absence of water, sulfur dioxide is used in the procedure of the present invention.

An advantage of the present invention is that it offers a quite simple and practical means for polymerizing the esters herein disclosed. Furthermore, the type of catalyst employed in the present invention is quite distinct from the customary organic and inorganic peroxide catalyst used heretofore in that it is not an oxygen yielding catalyst. Also, the catalysts of the present invention are unique in functioning not only as polymerization catalysts but, in the presence of an aqueous diluent, as an emulsifying agent for the polymer being formed. Naturally, this latter property is highly advantageous because it makes it possible to obtain polymer in finely divided form without the necessity of separately emulsifying the monomer and polymerizing with great care in order to avoid breaking up the emulsion. The polymer obtained upon breaking up of the emulsion is in readily usable form which requires substantially no subsequent purification unless it is desired to remove catalyst. As illustrated in the examples, the process of this invention permits polymer of high or low viscosity to be obtained readily by simply varying the temperature and conditions of polymerization.

With respect to the use of sulfur dioxide in excess of conventional catalytic amounts in the production of cast resins, two of the outstanding advantages are the increased rapidity of polymerization under conditions that will insure a flawless, bubble-free product, and the economy in substituting sulfur dioxide for an appreciable part of the more expensive polymer without effecting any noticeable difference in the appearance of the product.

As many apparently widely different embodiments of this invention may be made without departing from the spirit and scope thereof, it is to be understood that the invention is not limited to the specific embodiments thereof except as defined in the appended claims.

I claim:

1. Process comprising subjecting a monomeric ester of an alpha-methylene monocarboxylic acid to polymerizing conditions in the presence of sulfur dioxide.

2. Process comprising subjecting monomeric methyl methacrylate to polymerizing conditions in the presence of sulfur dioxide.

3. Process comprising subjecting a monomeric ester of an alpha-methylene monocarboxylic acid to polymerizing conditions in the substantial absence of water and in the presence of sulfur dioxide.

4. Process comprising subjecting monomeric methyl methacrylate to polymerizing conditions in the substantial absence of water and in the presence of sulfur dioxide.

5. Process comprising subjecting a monomeric ester of an alpha-methylene monocarboxylic acid in an aqueous diluent to polymerizing conditions in the presence of a polymerization catalyst from the group consisting of sulfurous acid, water soluble sulfites, and water soluble hyposulfites.

6. Process comprising subjecting monomeric methyl methacrylate in an aqueous diluent to polymerizing conditions in the presence of a polymerization catalyst from the group consisting of sulfurous acid, water soluble sulfites, and water soluble hyposulfites.

7. Process comprising subjecting a monomeric ester of an alpha-methylene monocarboxylic acid in a water-methyl alcohol mixture to polymerizing conditions in the presence of a polymerization catalyst from the group consisting of sulfurous acid, water soluble sulfites, and water soluble hyposulfites.

8. Process comprising subjecting monomeric methyl methacrylate in a water-methyl alcohol mixture to polymerizing conditions in the presence of a polymerization catalyst from the group consisting of sulfurous acid, water soluble sulfites, and water soluble hyposulfites.

9. Process comprising dissolving a monomeric ester of an alpha-methylene monocarboxylic acid in a water-methyl alcohol mixture containing a polymerization catalyst from the group consisting of sulfurous acid, water soluble sulfites, and water soluble hyposulfites, heating the solution to approximately its boiling point to polymerize said ester, and thereafter recovering the polymerized ester from the emulsion formed.

10. Process comprising dissolving monomeric methyl methacrylate in a water-methyl alcohol mixture containing a polymerization catalyst from the group consisting of sulfurous acid, water soluble sulfites, and water soluble hyposulfites, heating the solution to approximately its boiling point to polymerize said methyl methacrylate, and thereafter recovering the polymerized methyl methacrylate from the emulsion formed.

11. Process comprising subjecting a monomeric ester of an alpha-methylene monocarboxylic acid to polymerizing conditions in the substantial absence of water and in the presence of 5–15%, by weight thereof, of sulfur dioxide.

12. Process comprising subjecting monomeric methyl methacrylate to polymerizing conditions in the substantial absence of water and in the presence of 5–15%, by weight thereof, of sulfur dioxide.

13. Process comprising dissolving a substantial proportion of sulfur dioxide in a monomeric ester of an alpha-methylene monocarboxylic acid, disposing said monomeric ester in a mold, and subjecting same to polymerizing conditions to obtain a solid, bubble-free, polymerized mass.

14. Process comprising dissolving a substantial proportion of sulfur dioxide in monomeric methyl methacrylate, disposing said monomeric methyl methacrylate in a mold, and subjecting same to polymerizing conditions to obtain a solid, bubble-free, polymerized mass.

15. A solid, bubble-free cast article comprising a polymerized ester of an alpha-methylene monocarboxylic acid containing at least 5%, by weight of said ester, of sulfur dioxide.

16. A solid, bubble-free cast article comprising polymerized methyl methacrylate containing at least 5%, by weight of said methyl methacrylate, of sulfur dioxide.

17. A product comprising a polymerized ester of an alpha-methylene monocarboxylic acid containing at least 5%, by weight of said ester, of sulfur dioxide.

18. A product comprising polymerized methyl methacrylate containing at least 5%, by weight of said methyl methacrylate, of sulfur dioxide.

DANIEL E. STRAIN.